June 15, 1926.
A. A. RIETZKE
STEERING DEVICE
Filed Sept. 11, 1922
1,588,497
2 Sheets-Sheet 2
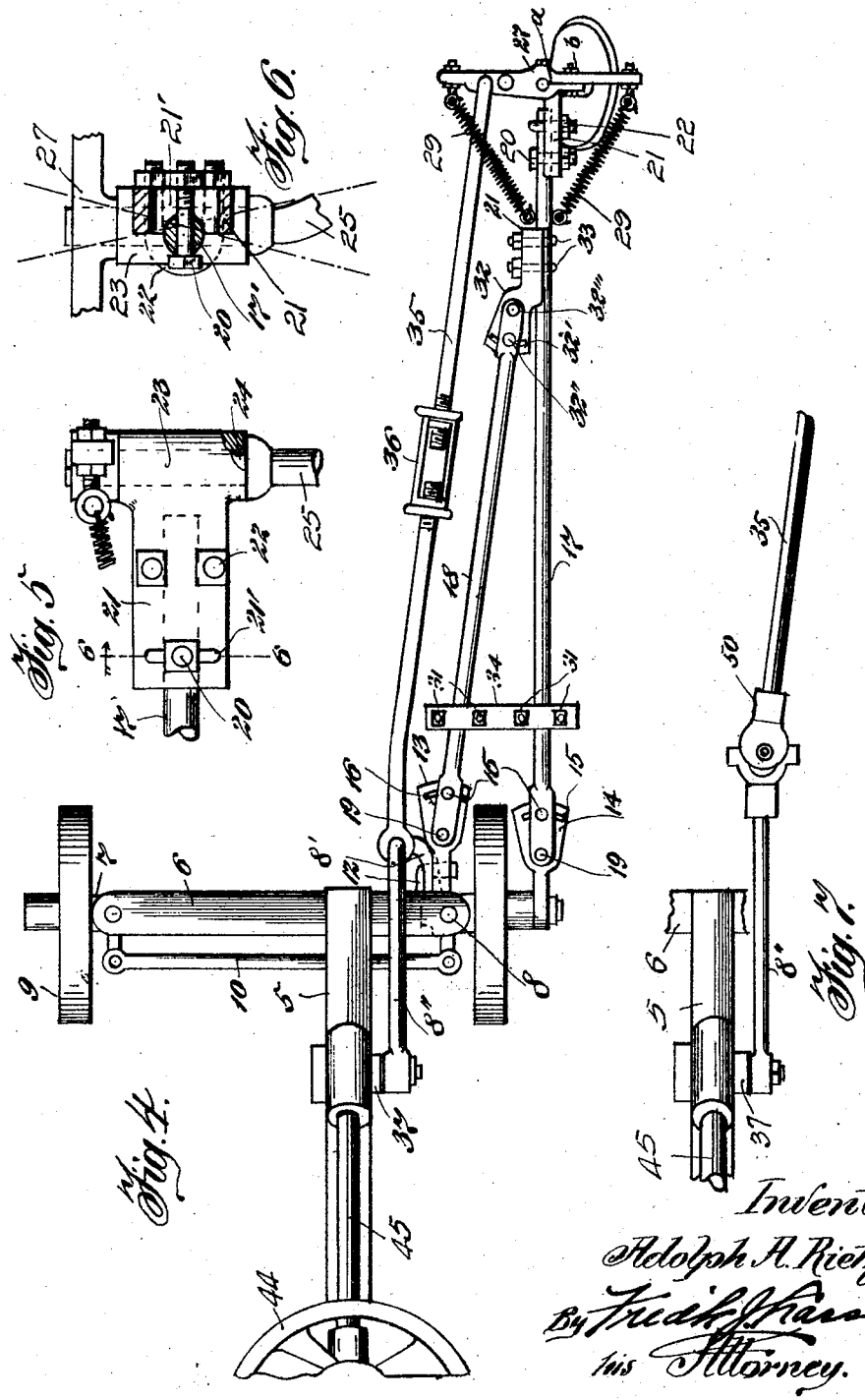

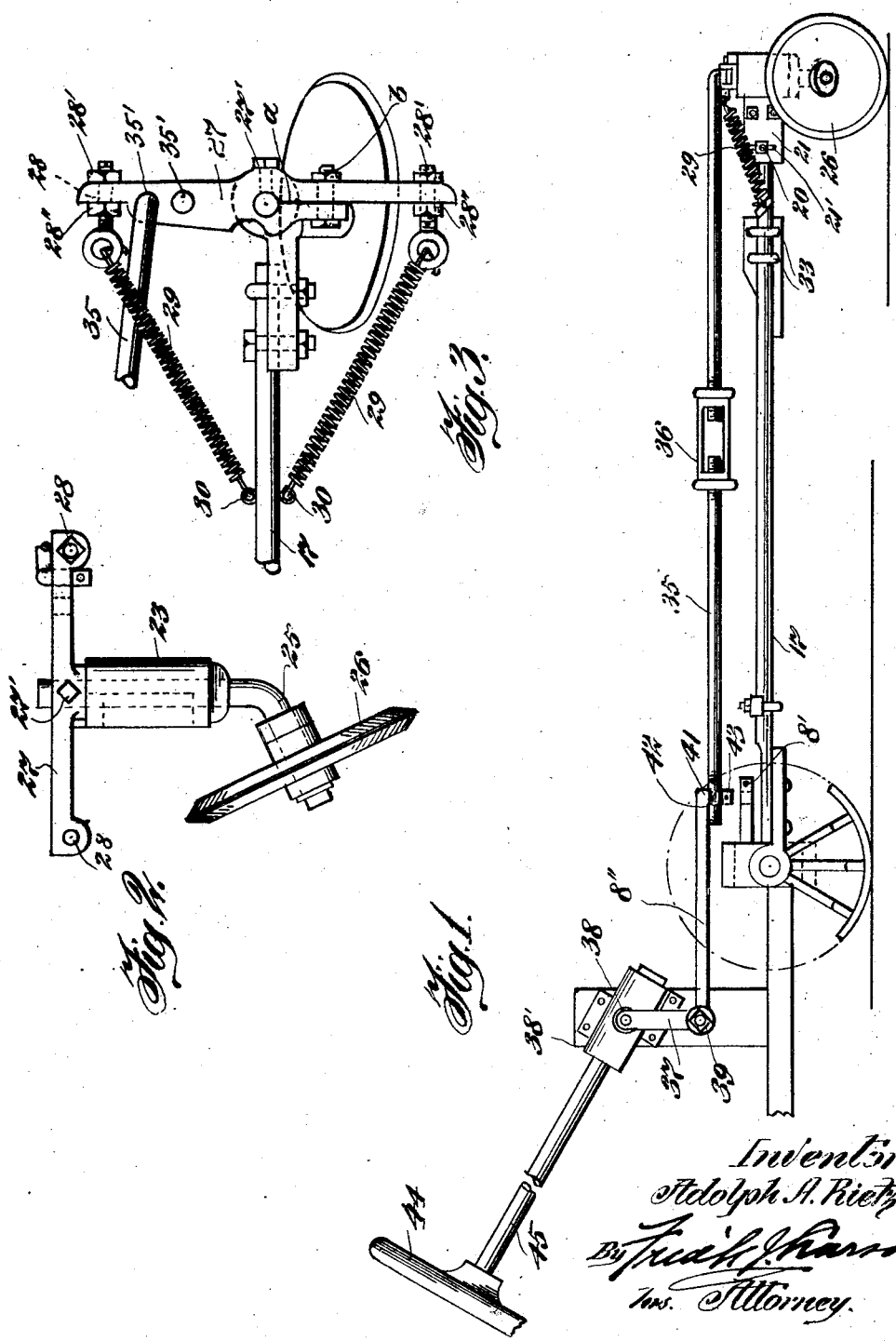

Patented June 15, 1926.

1,588,497

UNITED STATES PATENT OFFICE.

ADOLPH A. RIETZKE, OF VALLEY PARK, MISSOURI.

STEERING DEVICE.

Application filed September 11, 1922. Serial No. 587,357.

This invention relates to steering devices for tractors and is a distinct and practical improvement to overcome certain practical objections to, and defects in, parts of the structural elements of the steering device shown in my United States Patent Number 1,403,704.

Briefly stated, the structural elements in my present application conform, as hereinafter set forth, with my Patent Number 1,403,704, the new features being to eliminate the inward and outward stroke of the oblique steering control rod by the present method of oscillation and substituting therefor an axial and part rotational movement without transverse constraint for producing varying angularity of the caster steering wheel through rotary movement permitting a wide angle of variation in the vehicle's direction.

Further, to provide simple adjusting means for controlling the tension of the resilient means, which have the tendency to equal the pull upon the caster steering wheel to overcome slight movement of the caster steering wheel while rolling over irregularities in the surface over which the device is moving.

A further object of my invention is to provide means for adjusting the steering control shaft to the desired length so that the caster wheel control arm can be adjusted to lie parallel with the front axle of the tractor which is in normal position when the tractor wheels are straight.

A further object of my invention is to provide means for a positive and reliable steering effect wherein the steering wheel arrangement will describe in making their turn, differential arcs from a common center, and having their component parts rotationally arranged for the adjustment of the steering caster wheel to a predetermined point relative to the irregular formation of the ground surface where the caster wheel will be dependable for an easy or hard turning by the appended devices, such as harrows and the like.

A further object of my invention is to provide means for permitting rotational adjustment of the steering caster wheel bearing head upon its supporting shaft to permit adjustment of the steering caster wheel to a predetermined angle with relation to the surface of the ground. This is essential as the wheel will roll better at one angle than at another depending, of course, upon the surface the wheel is rolling, and whether the steering device is being used in connection with a harrow where it will roll in soft earth or with a plow where it will roll in the furrow, as is manifest.

With the above and other objects in view, the invention consists in the novel features of construction, arrangement and combination of parts hereinafter more fully described and finally pointed out in the claims hereto appended.

Referring to the drawings, forming a part of this specification, wherein like characters of reference denote similar parts throughout the several views:—

Fig. 1 is a side elevation of a steering device applied to a tractor and including the steering connections embodying my invention.

Fig. 2 is a detail in front elevation of the caster steering wheel, the bearing for its supporting shaft and the control arm fixed to the shaft.

Fig. 3 is an enlarged plan view of the forward end of the steering device.

Fig. 4 is a plan view of the device clearly showing the steering connection.

Fig. 5 is a detail in side elevation of the caster steering wheel shaft supporting bearing, adjustably mounted upon its supporting shaft.

Fig. 6 is a sectional elevation thereof, taken on line 6—6 of Fig. 5.

Fig. 7 illustrates a modified form of steering connection.

Referring to the drawings, 5 indicates the usual side rails of the tractor, which have suitable connection with the front axle 6. Steering knuckles 7 and 8 are pivotally connected to the axle 6 in the usual manner, on which are revolubly mounted the front or steering wheels 9. The steering knuckles 7 and 8 are connected in the usual manner by means of the tie rod 10 to permit the front wheels to be turned in unison. The steering knuckle 8 is also provided with the usual steering arm 8' to which the usual steering control rod 8" is connected when not used in connection with a steering device. The steering knuckle 8 which is pivoted, as at 11, is also provided at its inner end with an inturned right terminal arm 12 upon which is mounted an adjusting block 13. An adjusting block 14 is suitably mounted upon the outer end of the steering knuckle 8. Each block 13 and 14 is provided with a curved slot 15 to accommodate the bolts 16 that pass through the supporting rods 17 and 18, respectively, so that the supporting rods 17 and 18 may be adjusted laterally to accomplish a predetermined steering of the tractor and associated parts, such as a plow, harrow or the like.

The supporting guide rods 17 and 18 are both pivotally connected at their rear ends to the blocks 13 and 14, respectively by means of the bolts 19, the bolts 16 serving only to lock the rods in their adjusted positions with respect to the blocks.

The supporting rod 17 is the main supporting rod of the steering device, and the forward end thereof is provided with a horizontally disposed opening 17' to accommodate a locking bolt 20, which connects the steering head 21 to the rod 17. The steering head 21 is provided with a vertically disposed slotted opening 21' through which the locking bolt 20 also passes before the usual nut is applied thereto. This arrangement permits rotary adjustment of the steering head 21 upon the supporting rod 17, as is manifest. A U-bolt 22 is also carried by the head 21 and gripping a portion of the rod 17 to further secure the steering head against casual displacement with respect to a predetermined fixed position upon supporting rod 17.

The steering head 21 is formed with a bearing 23 through which extends and is journaled a vertically disposed shaft 24 having the curved lower extremity 25 on which a suitable caster steering or guide wheel 26 is revolubly mounted. The steering head 21 being in companionship relation to the cross head 27, is adapted to fulcrum both parts component to each other in tiltable position, as shown by the dash and dotted lines in Fig. 6.

A cross arm, or caster wheel control arm 27 is removably fixed to the upper end of the shaft 24 by means of a set screw 27'. One end of the cross arm 27 is reduced and provided with a slit a extending from its central shaft opening to permit of expanding the opening in applying the arm to or removing it from the shaft 24. A locking bolt b is provided for more firmly clamping the arm 27 to the shaft 24, thus serving to assist or aid the set screw 27' in holding the arm 27 at any fixed position upon the shaft 24, which is at a substantially right angle to the main supporting rod 17 and substantially parallel with the front axle 6 of the tractor, when in its normal position. The outer ends of the cross arm 27 are provided with openings 28 to accommodate eye bolts 28' locked in adjusted position by means of the nuts 28'' upon opposite side of arm 27. The eye bolts 28' are designed to accommodate the outer ends of a pair of suitable coiled springs 29 while the opposite ends of the coiled springs are connected to the main supporting rod 17 to the rear of the steering head 21, as by means of the bolts 30. Thus, it will be readily seen that I provide adjustable resilient means for holding the cross arm 27 in a substantial horizontal position and a substantial right angle to the supporting rod 17 against the adjusted tensions of the coiled springs 29, it being, of course, understood however that slight irregularities in the surface over which the machine is moving will cause slight movements of the steering or guide wheel 26 due to play between working parts which are righted by the equal pull of the coiled springs 29, as is manifest.

Also associated with the main supporting rod 17 and as shown in my former patent is an angular brace rod 18 which has adjustable connection with a suitable head block 32 which is clamped to the main supporting rod 17 to the rear of the steering head 21 by means of the U-bolts 33. The head block 32 is provided with a curved slot 32' which accommodates a locking bolt 32''. The rod 18 is further pivoted to the head block 32 by means of the bolt 32'''. In order that the rods 17 and 18 may be more securely locked in their adjusted spaced relation, a spacing bar 34 is provided and which is connected to the rods by means of the U-bolts 31.

In order that the steering or guide wheel 26 may be easily turned in either direction through manual operation, I provide an oblique shifting rod 35 having its forward end suitably and removably connected to the cross arm 27 by passing through one of the openings 35' thereof, a plurality of openings being employed to permit of a longer or shorter leverage for the push or pull by rod 35. To more firmly register the angular position of the steering or guide wheel 26, a turn buckle 36 is mounted about midway upon the threaded ends of the shifting rods which when united by the turn buckle constitute a unit.

The steering shaft assembly is composed of the rock shaft 37 concentrically mounted at its upper terminal 38 to the usual worm gear attachment of the tractor steering means 38'. Pivotally attached to the lower terminal 39 of the rock shaft 37 is one end of the horizontally disposed shifting rod 8'' which has a right angular extremity 41 at its opposite end engageable in an opening 42 at the rear end of the obliquely disposed shifting rod 35. The angular end 41 of the rod 8'' is held in position by means of a cotter pin 43.

When the steering device is detached from the tractor, the angular end 41 of the shifting or steering rod 8" is connected with the arm 8' of the steering knuckle 8 of the tractor to permit steering of the front wheel 9 through the medium of the hand wheel 44 mounted at the upper end of the steering post 45.

From the foregoing description, it is evident that the shifting rod 8" of the tractor can be utilized for steering the tractor when the steering device is detached and for connection with the oblique shifting rod 35 of the steering device when a steering device of the class described is attached to the tractor in the manner set forth. When the shifting rod 8" is united with the oblique shifting rod 35, it is completely disconnected with the arm 8' of the steering knuckle 8.

By means of the steering connection illustrated and herein described, the device is practically self steerable, excepting upon very irregular surfaces, thus permitting the operator to be free to go about the tractor oiling its several parts without having to hold one hand upon the hand steering wheel of the tractor while the tractor is moving with my steering device attached thereto.

In the modification shown in Fig. 7, the oblique steering rod 35 is provided with a universal joint 50 connected with the control rod 40 effecting an uninterrupted engagement in the rock shaft 37 eliminating all depending combinations comprising in its changed mechanical structure the functional elements as aforedescribed.

From the above description, it will be apparent that there is thus produced a steering device of the character described, possessing the particular features of advantage before enumerated as desirable, but which obviously is susceptible of modification in its form, proportions and construction of parts without departing from the principle or advantages enumerated in the appended claims.

What I claim is:—

1. In combination with a tractor having steering wheels mounted upon stub axles, an adjusting block having a curved transversely disposed slot fixed to the outer end of one of the stub axles, a rod adjustably connected at its rear end to the outer adjusting block, a steering head adjustably mounted at the forward end of said rod, a shaft carried by said steering head, a guide wheel mounted upon said shaft, a cross-arm fixed to the upper end of said shaft and disposed at a right angle to said rod, means for adjustably angling the steering wheel on the cross-arm, a head block mounted for longitudinal adjustment upon said first mentioned rod, an inner adjusting block, a second rod adjustably connected at its rear end to the inner adjusting block and at its forward end to said head block, a spacing bar connecting the rear ends of said rods in advance of the adjusting blocks, and coiled springs connecting the outer ends of the cross arm with the aforesaid first mentioned rod in advance of the head block.

2. In combination with a tractor having stub axles and the usual steering mechanism, an automatic steering device including an adjusting block removably fixed to the outer end of one of the stub axles, a second adjusting block fixed to the inner end of said stub axle, a rod adjustably connected at its rear end to said first mentioned adjusting block, a rod adjustably fixed at its rear end to said second mentioned adjusting block, a block adjustably fixed to the first mentioned rod near the forward end thereof, means for adjustably connecting the forward end of said second mentioned rod to said block, a head member rotatably adjustable upon the forward end of said first mentioned rod, a shaft supported by said head member, a steering wheel supported by said shaft, a cross arm fixed to said shaft, means for adjustably angling the steering wheel shaft on the cross-arm, and resilient means connecting the ends of the cross arm with one of the rods for normally holding the steering wheel to its adjusted angle.

3. In combination with a tractor having stub axles and having the usual steering mechanism, an automatic steering device including an adjusting block member removably fixed to the outer end of one of the stub shafts, an adjusting block member fixed to the inner end of the stub axle, a rod adjustably connected at its rear end to the first mentioned adjusting block member, a rod adjustably fixed at its rear end to the second mentioned adjusting block member, a block longitudinally adjustable upon the first mentioned rod near the forward end thereof, means for adjustably connecting the forward end of said second mentioned rod to said block, a head member rotatably adjustable upon the forward end of said first mentioned rod, a shaft supported by said head member, a steering wheel supported by said shaft, a cross arm adjustably fixed to the upper end of said shaft, means for adjustably angling the steering wheel shaft on the cross-arm, and coiled spring elements connecting each end of said cross-arm to said first mentioned rod.

4. In combination with a tractor having stub axles and having the usual steering mechanism, an automatic steering device including an adjusting block member removably fixed to the outer end of one of the stub axles, an adjusting block member fixed to the inner end of the stub axle, a rod adjustably connected at its rear end to the first mentioned adjusting block member, a rod adjustably fixed at its rear end to said second mentioned adjusting block, a block adjustably fixed to the first mentioned rod near the forward end thereof, means for adjustably connecting the forward end of said second mentioned rod to said block, a head member rotatably adjustable upon the forward end of said first mentioned rod, a shaft supported by said head member, a steering wheel supported by said shaft, a cross arm fixed to the upper end of said shaft, means for adjustably angling the steering wheel shaft on the cross arm, and spring elements connecting each end of said cross arm to said first mentioned rod for normally maintaining the adjusted position of the steering wheel for automatically steering the tractor in a predetermined course.

In testimony whereof, I have hereunto signed my name to the specification.

ADOLPH A. RIETZKE.